United States Patent [19]

Leach

[11] 3,973,973

[45] Aug. 10, 1976

[54] LIGHTWEIGHT AGGREGATE AND COMPOSITION AND METHOD OF MAKING SAME

[76] Inventor: Sam Leslie Leach, 32653 Seagate Drive, Palos Verdes Peninsula, Calif. 90274

[22] Filed: June 27, 1974

[21] Appl. No.: 483,776

Related U.S. Application Data

[63] Continuation of Ser. No. 284,589, Aug. 29, 1972, abandoned.

[52] U.S. Cl. ............................ 106/40 R; 106/288 B
[51] Int. Cl.² .......................................... C04B 31/00
[58] Field of Search ...................... 106/40 R, 288 B; 264/43

[56] References Cited

UNITED STATES PATENTS

| | | | |
|---|---|---|---|
| 2,485,724 | 10/1949 | Ford | 106/40 R |
| 3,202,518 | 8/1965 | Whittemore | 106/40 R |

*Primary Examiner*—J. Poer
*Attorney, Agent, or Firm*—Cantor & Kraft

[57] ABSTRACT

A composition of a silica-containing material and an additive of organic and inorganic materials which decomposes to generate gases at low temperatures is disclosed along with a method of making a lightweight aggregate from the composition.

6 Claims, No Drawings

LIGHTWEIGHT AGGREGATE AND COMPOSITION AND METHOD OF MAKING SAME

This is a continuation of application Ser. No. 284,589, filed Aug. 29, 1972, now abandoned.

BACKGROUND OF THE INVENTION

This invention relates to construction materials, and more particularly this invention relates to lightweight aggregates and a composition and method for producing the same.

For many years the construction industry has used natural aggregates such as sand, gravel, limestone, and granite in concrete. The industry has found, however, that supplies of these natural aggregates are limited in certain geographic areas and they must be transported into these areas at great cost. Additionally, overall supplies of natural aggregates are rapidly being depleted. Equally important is the fact that with new construction methods and materials, lightweight aggregates have become a necessity. Thus, some lightweight aggregates have been developed to replace natural aggregates in the construction industry. Most of the lightweight aggregates are based on expanded clay and/or shale.

While some prior art expanded clay and/or shale are known and used for construction material lightweight concrete aggregates, their manufacturing constitutes the selection of a particular type and class of shale or clay with inherent properties which exfoliate or expand upon being subjected to high heat in a kiln or sintering operation. These clays will not expand until the mass has reached temperatures above fusion points at which time the material is molten and capable of expansion. Unfortunately, however, all known methods of commercial production subject this material to rolling, tumbling, compacting forces of significant impact, sufficient to neutralize most of the expansion by again compacting the expanded material while it is in the state of fusion, and before it cools.

Additionally, the physical and chemical structure of the raw clay or shale is so consistently variable throughout a given volume that adequate gas generating sources may not be present at all in the chemical structure, therefore, the clay or shale is simply reduced to a compacted ceramic with no value as a lightweight aggregate.

An industry study evidenced that the average cubic yard of clay or shale would provide a finished product of 1.207 cubic yards of loose fill aggregate volume. This amounts to a total gain of 20 percent expansion. Additionally, the fused mass is ejected from the kiln or sintering operation, as large masses of fused (to semi-fused) clinkers which must be impact ground to reduce the large masses to products of small size, which are compatible with cement as a concrete aggregate.

Additional facets of the problem include questionable availability of the basic clays and/or shales of the type which are required, and the proximity of this essential material to the operation. Although some manufacturers appear to have located their operations near adequate reserves, others have learned that their reserves are inadequate and it has become necessary to transport suitable raw clay for great distances in order to support the operation.

Also, adding to the foregoing problems and disadvantages of the prior art, there are considerable variations within the average clay deposit. These variations occur in any deposit from top to bottom, from side to side, and from front to back. The density varies, the chemical composition changes, and as a result the physical characteristics become a constant variable which places a responsibility on the kiln operator that is effectively beyond his control. For example, a variation in the clay chemistry of a nominal 10 percent toward alumina would require the kiln temperatures to be increased by at least 100°F to insure vitrification. Compounding the problem, the kiln operator normally will not be aware of the deviation until the material has already completed the firing cycle. Even assuming that good quality control alerts the kiln operator of an under-fired condition, the kiln response to changes in firing temperature is so slow that a lengthy period of time is required to effect a change in temperature. Thus, the chemical characteristics of the clay could have changed again completely in still another direction before the kiln response factor is complete.

It, therefore, follows that a considerable amount of the commercial product now on the market is actually an averaging of errors and a continuing compromise in quality. A large percentage of the commercial product is not expanded at all and/or is under-fired to the extent that it is relatively soft and very absorptive.

Additionally, kiln operators and supporting labor represent a significant part of the total manufacturing cost of lightweight aggregates. It is, therefore, difficult for the lightweight aggregate to be competitive with natural aggregates which involve an extremely low labor cost. Thus, there is a need for a lightweight aggregate which could be manufactured at a lower unit cost than those presently used.

Comparing the present "bloated clay" lightweight aggregates with the natural, or heavy, aggregates, it is known that the lightweight aggregates will provide a concrete mix of acceptable strength which weigh only 100 to 120 pounds per cubic foot whereas the concrete made with a natural or heavy aggregate weighs 140 to 160 pounds per cubic foot. It has been recognized that this weight differential can be translated into design changes in structures of all types which will yield savings in transporting, handling, placing, and pumping, as well as in the dead weight of the structure which must be supported with steel in many instances.

Additionally, the expanded clay lightweight aggregate has been found to be excellent for road-building as well as for bridge structures. The utility in road-building is enhanced because as the cement wears, exposed aggregate of expanded clay provides excellent traction since it is not self-polishing as is, for example, limestone.

Thus, there is a need for a lightweight aggregate having such physical characteristics as high temperature resistance, high tensile strength, lighter weight with the same strength as present lightweight aggregates, and chemical resistance, as well as being cheaper to manufacture.

SUMMARY OF THE INVENTION

It is, therefore, an object of the present invention to provide a lightweight aggregate free of the aforementioned and other such disadvantages.

It is a primary object of the present invention to provide a composition for making a lightweight aggregate based on a silica-containing material.

It is another object of the present invention to provide a composition for making a lightweight aggregate using a silica-containing material and an easily obtainable, inexpensive, additive.

It is another object of the present invention to provide an aggregate that is expanded to several times its original volume while retaining a substantial coating over the expanded unit to prevent moisture intrusion.

It is still another object of the present invention to provide a lightweight aggregate having any desired weight and density.

It is yet another object of the present invention to provide a composition for making a lightweight aggregate of consistent quality and under all conditions of environment.

It is a further object of the present invention to provide an additive for use with a silica-containing material to thereby produce a lightweight aggregate consistent with the foregoing objects.

It is another primary object of the present invention, consistent with the foregoing objects, to provide a method for making a lightweight aggregate from silica-containing materials.

It is a still further object of the present invention to provide a method for making a lightweight aggregate inexpensively and by using conventional equipment.

Consistent with the foregoing objects and in accordance with the instant invention, a composition for producing a lightweight aggregate is provided, the composition comprising a major proportion of a silica-containing material and a minor proportion of a gas-generating additive. The additive comprises a combination of inorganic materials which decomposes to generate gases at relatively low temperatures. In its basic aspect, the additive will decompose to generate gases at temperatures of up to about 1500°F. In a preferred aspect, the additive will decompose to generate gases at a temperature between about 150°F and about 1500°F. In accordance with another aspect of the instant invention the additive will decompose to generate gases in up to four stages, that is it includes four separate gasing systems. In the first stage, gases will be generated at up to 1500°F, preferably from about 150° to about 1500°F. In the second stage, gases are generated in the range of from 1550°F to about 1650°F. In the third stage the gases are generated at from about 1650° to about 1800°F. In those compositions where there is a fourth stage, the gases are generated in the range of from about 1800° to about 2250°F.

A most important aspect of the present invention is the fact that a silica-containing material, generally, is used as the basic material in the composition. In prior art compositions and methods, clay or shale is used and, significantly, only clay or shale having a particular composition so that it will "bloat" by self-generated gases at high temperatures. In the instant invention, on the other hand, the silica-containing material can be silica sand, fly ash, or any mineral of sedimentary origin which will mature on firing. Such sedimentary minerals include clay, shale, and slate. It is significant to note that if a clay or shale is used, the particular composition is not critical to the instant invention, the only important criterion being that it is silica-containing. Thus, the clay can be china clay, flint clay, ball clay, brick clay, siliceous clay, plastic fire clay, or montmorillonite, for example.

As already mentioned, in the prior art, only clay of a particular composition could be used since the mineral balance of the clay provides the "bloating" and the "vitrification" essential to the product. The clay having the necessary mineral balance is charged to a rotary kiln and heated to a high temperature to cause the clay particulates to melt and become plastic at which point the resident minerals generate gases which "bloat" the particles of glassy-plastic molten material. Unfortunately, the rotary kiln concurrently is rolling, tumbling and dropping huge masses of this material upon itself continuously during the entire operation. The net result is a gassing and expanding operating opposed by a tumbling, rolling, dropping, and compacting operation.

On the other hand, with the instant invention, the composition which includes the silica-containing material such as clay is heated to a relatively low temperature, particularly a temperature below that at which melting occurs. The additive generates gases at temperatures as low as 150°F to provide the entire expansion needed for making the lightweight aggregate. This gas generation occurs at temperatures up to about 1500°F. This is done while the composition is still plastic from absorbed water. The water leaves almost instantly during the initial expansion and then the very hard and already expanded materials travel through the firing cycle to vitrification. The remaining gassing systems maintain the material in its expanded condition during the remaining firing cycles.

Basically, the method of the instant invention includes the steps of mixing the silica-containing material and the additive and including sufficient water to make the mixture extrudable. The composition is then extruder-pelletized and fired in a conventional rotary kiln. The temperatures used, however, are relatively low and, in fact, the temperature is kept below that point at which the material will reach a pyroplastic condition.

Because the variations in the basic clay chemistry are unimportant they become irrelevant to the product quality. The kiln is simply operated at temperatures which ensure vitrification. The additive provides the gassing action at the beginning and then provides "follow-up" gassing systems throughout the firing cycle which maintains the original expansion intact.

The additive also provides a "fluxing" action to the component minerals which promotes vitrification activity at lower temperatures. This, in turn, promotes additional crystal growth within the particulate which then results in greater strength.

This invention will be better understood, and objects other than those set forth above will become apparent, when consideration is given to the following detailed description thereof.

DESCRIPTION OF THE PREFERRED EMBODIMENTS

Before proceeding with the description of the preferred embodiments of the instant invention, it is desirable to first consider the raw materials being used and the phenomena occurring when practising the method of the instant invention. The basic material used for the lightweight aggregate is a silica-containing material. According to the instant invention, ordinary beach sand, or virtually pure silica, has been used. Additionally, fly ash has been used as well as minerals of sedimentary origin which mature on firing. Such minerals include clay, shale, and slate. Any slate which will mature on firing can be used in the same way as any other material in the instant invention once it has been pulverized to the required particle size. Since clay and shale, however, are the preferred such materials, they will be described herein in more detail.

CLAYS

A concise description of clay is as follows: Clay is a fine-grained material which is powdery when dry and becomes plastic when wet, leather-hard when dry and on firing is converted to a permanent rock-like mass.

All clays comprise (a) one or more clay minerals, and (b) other minerals, the proportions of each varying according to the origin and subsequent natural ageing of the clay.

1. China Clays.

China clays are principally residual clays formed in situ by the breakdown of primary minerals. The principal deposits of this type of clay are the result of hydrothermal reactions in granite masses.

The principal mineral to be changed is the feldspar, and the reaction may be stated like this:

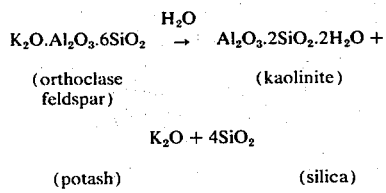

2. Kaolinite, $Al_2O_3 \cdot 2SiO_2 \cdot 2H_2O$.

The term kaolinite is derived from the Chinese *Kaoling* (High Hill), the name of the mountain from which the first kaolinite was shipped to Europe. Commercial kaolins contain 80 to 90 percent of the clay mineral, contaminated principally with quartz and fine-grained mica or hydrous mica.

Pure kaolin or china clay is white - firing and has a refractoriness of about 1785°C. Kaolins which have been found by surface weathering agents almost always contain a higher proportion of Fe. These clays fire brown, red or pink.

3. Halloysite-bearing Clay.

Clays which contain the clay mineral "halloysite" resemble china clays in appearance and some properties, but are more plastic and provide a denser product when fired.

Halloysite is a common component of some American "flint" clays, especially in Utah and Indiana.

4. Ball Clays.

In the United States excellent ball clay deposits are in Kentucky and Tennessee.

Chemical analysis evidences that ball clays are richer in silica than china clays, with a smaller portion of alumina.

The minerological composition is variable, however, the three main components are always the clay mineral (either livesite or kaolinite), hydrous mica and quartz with some primary mica and titania.

Carbonaceous matter is present in finely-divided, possibly colloidal form, surrounding grains of other minerals.

5. Flint Clays.

Flint clay is a hard, almost non-plastic material, high in alumina.

Composed principally of a kaolin mineral and diaspore, the monohydrate of alumina.

Commercial amounts of flint clays are found in Missouri, Pennsylvania, Ohio, and Illinois.

6. Shales.

Although not a clay, shale is discussed here for convenience. When a refractory type of clay has again been compacted by pressure in such a manner that the mass readily cleaves in well-defined planes, the material is termed shale.

7. Brick (Building) Clays.

The principal properties required of a clay for general use such as bricks, pipe, hollow tile, etc., are that: (a) consistent deposit as possible; (b) very large reserve; (c) plastic enough to mould into and retain shapes; and (d) vitrify at about 950° – 1100°C.

8. Montmorillonite.

This is a mineral which originally was called a "group" of minerals, but which presently has a more restricted meaning, designates a compound which is essentially a hydrated alumino-silicate.

Many clays contain montmorillonite type minerals, however, the most prominent one is called Bentonite.

Since the montmorillonite group are very desirable components in the lightweight aggregate industry this material will be examined carefully.

In the course of a general survey of montmorillonite minerals from numerous sources, over 100 samples have been analyzed by ROSS and HENDRICKS, who express the formula in the following general terms:

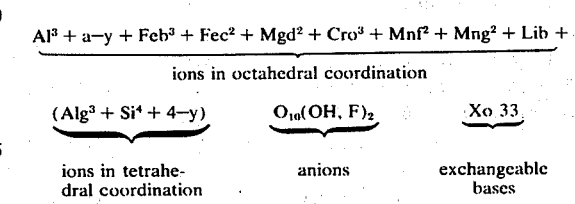

This simply means that these minerals can have a variety of cations in octahedral positions, i.e., in the central hydroxide layer; and silicon and aluminum ions in tetrahedral positions in the hexagonal network.

The calculated structural formula for the more than onehundred samples of montmorillonites has clarified present day knowledge of this mineral group.

The number and type of cations in the octahedral layer can be calculated and evidence that there is a major distinction between the minerals of the montmorillonite group, because the number of cations in the central sheet was either between 2.00 and 2.22 or between 2.88 and 3.00. Both a dioctahedral and a trioctahedral series are therefore clearly shown.

The amount of sustitution in the silica (tetrahedral) layer and in the central (octrahedral) layer of cations can be calculated to evidence that montmorillonites form continuous series of minerals with end members which could be predicted with some assurance.

Although many cations are present in the structure, those which occur in appreciable amounts are limited to silicon ($Si^{4+}$), aluminum ($Al^{3+}$), magnesium ($Mg^{2+}$), iron in the ferric ($Fe^{3+}$), and ferrous ($Fe^{2+}$) forms, and lithium ($Li^+$).

Bentonites and montmorillonite clays are for the most part extremely small in size. The larger proportion of clay particles are less than 0.05 micron, and those above this size are believed to be agglomerates. In a watery suspension, the ultimate particle of montmorillonite clays are only a few Angstrom units in size.

Montmorillonite minerals are often expressed chemically as having the formula $Al_2O_3$ $4SiO_2$ $H_2O$, however, the aluminum content can be very small as it is in the cases of "nontronite" and "hectonite." It is not even accurate to express the formula as:

because the molecular ratio of metallic oxide to silica may approach 1:2, as in "beidellite," "nontronite," and "saponite."

Only in ideal montmorillonite is the oxide ratio about 1:4. Since only the composition of the layers which make up the montmorillonites have been described; we must observe the extension in the C-dimension, i.e., the stacking of successive layers.

Alkali or alkaline earth metal cations which are absorbed by the layers in montmorillonite are important in the linking of adjacent units. Such ions penetrate between the layers and, although not held firmly in any way, it is believed that they form a bridge between the two negatively charged units. Apparently, also, stacking of successive layers is completely at random; some minerals are fibrous in habit, e.g., "hectorite," suggesting that the layers may be distorted as in "halloysite" or "chrysotile."

Montmorillonites evidence great plasticity, stickiness and strength in wet, dry, and fired states.

The great strength is believed to be because montmorillonites have this extraordinary capability of absorbing cations and holding them strongly.

As cations are positively charged it is assumed that the layers have a net negative charge, the result of ionic replacements within the lattice. Therefore, the replacement of an $Al^{3+}$ by a $Mg^{2+}$ cation in octahedral coordination creates a unit deficiency of charge. In the mineral itself, magnesium appears to replace aluminum in the nominal ratio of 1 to 6, and in other minerals of the montmorillonite group ferrous ions can replace, and aluminum ($Al^{3+}$) can replace silicon ($Si^{4+}$) in the hexagonal network.

BLOATED CLAY

Bloating is a distortion of the shape of a clay product that occurs during the vitrification stage of firing, and is the result of the generation of gas within the clay mass. To produce bloated clay, two conditions are necessary. There must be a reaction evolving gas at an adequate rate and volume, and there must be adequate viscous glassy matter present to prevent free escape of the gas and to produce distortion by the pressure generated. It has been learned that a suitable composition to yield a bloating aggregate would be within the parameters: $SiO_2$ — 75 to 50%; $Al_2O_3$ — 15 to 30%; $CaO + MgO + Fe_2O_3 + K_2O + Na_2O$ — 10 to 20%. Some natural clays and slates fall within these parameters. It is not necessary to add gas generating ingredients as they are often present in adequate quantity without special provision. The firing schedule is relatively short and the temperature relatively high, 10 to 20 minutes at temperatures around 1,150° to 1,270°C. (2,102° to 2,318°F.)

It is usual to grind the clay or shale very fine, to make it plastic with water, to extrude it in the form of rods of 0.25 to 0.50 inch diameter, and to cut these into lengths of less than 1 inch.

After they have been dried they are fed into a rotary kiln, fired with oil, gas, or coal. Another system utilizes a forced intense fire to vitrify the pellets mixed with coke on a grate. Some additional coke may be mixed in with the clay in the extruded pellets.

EFFECTS OF CALCIUM IN CLAYS

1. Calcium acts as a flux at higher temperatures, i.e., combines with alumina and silica to form low melting-point liquids, therefore this eutectic reaction reduces the vitrification temperature and refractoriness of the clay.

2. Produces a mobile, fluid liquid of great corrosive power. When cooled, the liquid readily forms a glass which acts as a strong bond and enhances impermeability and/or resistance to acids and other chemicals.

3. At a dull red heat, calcium compounds may combine with iron minerals and "bleach" the red color.

4. Calcium carbonate, when heated to at least 900°C is converted to CaO which, if it remains uncombined on cooling, may become a problem later.

5. Calcium sulphate is stable on low firing, and may remain so unless combined or converted, (decomposes at temperatures between 900° and 1,200°C to form calcium oxide and sulphur trioxide).

6. Calcium compounds normally will increase the vitrification range.

7. Calcium silicates melt at a comparatively low temperature, and act as a flux in a manner similar to CaO, but more slowly. The calcium alumina-silicate produce a tougher and more viscous bond than simple silicates.

SULPHUR IN CLAYS

Sulphur compounds in clays are chiefly "pyrites," and various sulphates, usually calcium, magnesium and sodium.

Small amounts of sulphur compounds may be a major factor in the bloating of low-grade fireclays and other clays at temperatures around 1,150°C. In clays rich in iron, sulphur compounds are often responsible for producing "black-hearts" by maintaining the iron in a reduced state. This is often confused with the residue from undecomposed carbonaceous matter, but it can be distinguished by its steely appearance and the sharp line of demarcation between the black zone and the surrounding red color of the fired clay.

CARBONACEOUS MATTER IN CLAYS

1. Evidenced as a dark color in the clay.
2. May produce reducing conditions during the kiln firing to affect the vitrification schedule.
3. May burn too rapidly in the kiln and cause over-vitrification and loss of shape.
4. May result in "black-heart."
5. May result in excessive porosity.

The presence of an amount of low-rank carbonaceous matter, e.g., algae or oily materials, is an advantage in some clays, because if the firing is carefully controlled, the organic components decompose steadily over a wide range, which reduces the total fuel required. High-rank carbonaceous matter, e.g., bituminous and anthracitic coals, is less desirable in clays, because it commences to burn only at high temperatures, to burn very rapidly, which tends to over vitrify.

In all cases where a clay contains sufficient organic matter and sufficient fluxing materials, such as lime or soda compounds, the firing process is difficult to control and results in black-hearts and variable uncontrolled bloating.

MICACEOUS MINERAL IN CLAYS

A "micaceous mineral" is classed as a hydrous mica because it contains less potash and more water of constitution than true muscovite. This mineral is of variable composition and is, therefore, difficult to estimate in clays, especially when it is present in fine grain-sizes. An average molecular composition of the micaceous component is:

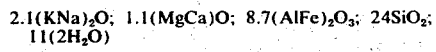

$2.1(KNa)_2O; 1.1(MgCa)O; 8.7(AlFe)_2O_3; 24SiO_2; 11(2H_2O)$

Some idea of the total amount of hydrous mica in a clay is shown by the total alkali figure, determined by chemical means, after first deducting the exchangeable bases in the clay. In the average hydrous mica, the alkali content is about 6.7 percent, therefore a clay with 2 percent total alkali may contain as much as:

$$\frac{2 \times 100}{6.7} = 30 \text{ percent}$$

of hydrous mica. If the proportion of alkali in the hydrous mica is lower, the relative amount of this mineral will be higher still. It can be readily seen that clays containing adequate amounts of hydrous mica, can be utilized to bloat or exfoliate a form of lightweight aggregate, although not a preferred source.

POTENTIAL AND ACTUAL PLASTICITY

In evaluating the plasticity of clays it is necessary to distinguish the ACTUAL (or active) from the POTENTIAL (or dormant) plasticity.

Obviously a dry clay is non-plastic, but on being mixed with a suitable quantity of water it will become plastic, the amount of plasticity depending on the mineral content and history of the clay.

The POTENTIAL PLASTICITY of a clay is an inherent property, and actually is the maximum plasticity which can be developed by suitable treatment of the clay. The ACTUAL PLASTICITY is the plasticity at the moment of examination. Some clays readily absorb water while others do so only slowly, and the following factors contribute:

1. The particle size of the material and the capillary nature of the compacted mass.
2. The hygroscopic nature of the minerals comprising the clay.
3. The presence of soluble salts which may change the surface tension of the water.
4. The presence of organic materials in the clay which retard the "wetting process" by the water, and therefore retarding penetration.

Many clays are potentially, rather than actually plastic, which means that suitable amounts of water must be added and absorbed to increase the plasticity to the potential, or to the point where the clay mass can be utilized in the manner desired.

THE NATURE OF PLASTICITY

The phenonmenon of plasticity in clays is a fascinating study. It is generally agreed that plasticity is associated principally with particles which are of colloidal dimensions, and therefore probably related to the fundamental concepts of the colloidal micelle.

Clay particles when suspended in water are surrounded by a hydrosphere within which are contained ions of different charges. Around the ultimate particle there is a layer of negatively-charged ions and these are balanced by a swarm of cations which are diffused within the hydrosphere, which varies in size depending on the number, size, charge, and the degree of hydration of the cations. When the hydrosphere is large, the particles in suspension are at the maximum separation and are rather free, viscous flow is possible as a result of the excess water content. On the other hand, as the hydrosphere is reduced, the separating water film becomes thinner and more cohesion results.

The counter-cations provide links between the colloidal particles and rigidity in linkage, or plasticity develops. The application of a shearing force causes movement of the charged particles, but an equally stable system is readily formed, which retains its new shape after the removal of the force. Consequently small, unhydrated cations absorbed around a clay particle give greater plasticity than larger, hydrated ones, all else presumed equal.

Plasticity is therefore related to the formation of water films of a certain order of thickness around each grain. When more than the required amount is present the "free-water" permits flow, with a reduction in plastic properties. At the correct content of water to "starve" the clay, the individual particles touch and plasticity is again destroyed.

These adsorbed water films appear to have an induced structure by virtue of the surface with which they are in contact, and a continuum is thus formed which surrounds all of the particles and provides a degree of rigidity and at the same time an ease of deformation.

The thickness of the water film present in clay at maximum plasticity is difficult to calculate with certainty, however, NORTON and HODGDON have determined that under a pressure of 8 kg. cm.$^{-2}$ the film thickness varies with different clays as follows:

| CLAY | FILM THICKNESS IN A |
|---|---|
| China Clay | 2100 |
| Ball Clay | 2400 |
| Brick Clay | 3100 |
| Bentonite | 3400 |

MATTSON has estimated that in soil clay the thickness of the water film is about 700 A, although this may not have been at maximum plasticity.

The dependence of plasticity on both the water content and the nature of the associated cations must lead to the conclusion that the property is associated with the complex electrical relationships surrounding the colloidal micelle.

When the zeta-potential of a system is of low order, the counter-balancing cations influence the system only at short distances from the mineral surfaces. Nevertheless, when the counter-balancing cations are of small size and high charge, they impose a more rigid structure on water molecules in their area, than those of large size and small charge do.

At low water contents, the hydrospheres around each particle merge and the mass attains a stability of structure formation in which continuity is developed between rigidly bound water molecules in adjoining particles.

FACTORS AFFECTING PLASTICITY

Clays are quite different in the amount and quality of their plasticity. The "fat" or "strong" clays undergo a maximum change in shape on the application of a small force; "lean" or "short" clays undergo a minimum change of shape and require a greater force to evidence the change; some clays are both "strong" and "short", i.e., they require a large force to deform them, and change only slightly in shape before rupture. Therefore, in comparing clays, it is essential to include the amount of change of shape as well as the force essential to produce it.

The plasticity of clays is affected by:

1. The effect of water on the solid particles and colloidal phenomena.
2. The size of the solid particles.
3. The composition of the solid particles.
4. The size distribution of the particles.
5. The shape of the solid particles and their internal structure.
6. The aggregation of the solid particles.
7. The surface area of the solid particles and their intermolecular attraction.
8. The presence of other minerals which may influence either the water or the solid particles.
9. The orientation of particles in the mass.
10. History of the material (environment).

It is universally agreed that plasticity in clays exists within a comparatively narrow range of water content. Above a certain value the clay mass becomes a "mud" or a "slip" while a dry clay is completely without plasticity. The maximum plasticity of a clay is developed at a specific water content which corresponds with a film around each particle about 2000 A thick. For many clays, this would be approximately a water content of from 15 to 25 percent range by weight.

MOBILITY

The expression mobility is used to describe "ease of movement"; it can be related to solids.

The mobility of a clay depends on its plasticity. If the plasticity is low, or if adequate water is not present, the material will be largely immobile, however, a "plastic" material is readily mobile.

EXTRUDABILITY OF CLAYS

Closely related to the mobility and plasticity of clay is the facility with which it can be made into useful shapes by extrusion through a die, in an extruder. In order that the extruded products may be commercially useful, the clay must be "plastic" as well as mobile, therefore, no simple statement can be used to express its extrudability. Probably the simplest mode of expression is in terms of viscosity, i.e., in the ratio between the quantity extruded in unit time and the pressure required to extrude.

For clays which appear to lend themselves to extrusion processes, a moisture content of about 18 percent appears favorable.

There are two broad classifications of extrusion processes. These are SOFT EXTRUSION involving materials with a moisture content of 14–18 percent, and pressures of about 1,000 lb. per square inch; and STIFF EXTRUSION for clays with about 10–14 percent moisture content, which requires pressures of about 2,200 lb. per square inch.

BINDING POWER OF CLAYS

The binding power of a clay must not be confused with its plasticity, although both are dependent on the nature and proportion of the colloidal gel matter present.

The binding power of a clay is analogous to the property possessed by various colloidal gels, of retaining particles in their mass in a state of suspension. It appears to be due almost wholly to the viscous liquid constituent of the plastic clay, but the amount of nonplastic material which can be incorporated with any given clay is limited by the amount of such material already present. Therefore, any treatment which increases the proportion of viscous material in the mass also increases its binding power.

The principal effect of water on the binding power of clay, is to increase the volume of the colloidal gel matter present and, therefore, to permit this gel to cover a large surface of inert material.

The binding strength of clays is dependent on many factors although the surface area, or amount of colloidal fraction, is probably the most important. Therefore, the montmorillonite clays are superior to those of kaolinite type, as is shown:

BONDING STRENGTH OF CLAYS

| Clay Type | Cross Breaking Strength (Grams/cm.$^2$) |
|---|---|
| Kaolinite | 200 – 250 |
| Fire Clays | 150 – 450 |
| Ball Clays | 400 – 580 |
| Bond Clays | 600 – 800 |
| Montmorillonite | 1500 – 2500 |

The binding power of clays is evidenced in both the "wet" state and in the "dried" material.

FACTORS AFFECTING STRENGTH ON CLAYS THAT HAVE BEEN FIRED

The chemical or mineralogical composition frequently has a very important effect on the strength of ceramics.

The mineralogical nature of the raw clay becomes extremely important when the clay has been fired.

Clays and other ceramic materials are "fired together," and chemical reactions (to be described hereinbelow) take place between mineral components.

The liquid which forms on firing, surrounds the more refractory grains, and on cooling, the resultant glassy phase provides a continuous bond. Crystal growth may also provide a mass of interlocking particles of high strength. Each of these characteristics depend on the chemical and mineralogical nature of the material.

Shales and indurated clays produce masses which are weaker in the raw and dried state, but develop great strength on firing, so that the strength finally attained may not be greatly different from that reached by more plastic clays and non-plastic minerals.

The principal difference is that while "plastic" clays will develop great strength when heated to a relatively low temperature of 900° to 1,000°C (1,652° to 1,832°F.), lean clays must be heated to a higher temperature of 1,200° to 1,600°C (2,192° to 2,912°F.), so that they undergo adequate vitrification in order to attain the same strength.

The temperature attained in the firing affects the strength of the finished and cold material, because it determines to a large extent the amount of fusible matter or bond produced, and this of course controls the strength of the mass. GRIMSHAW and SUTTON have measured the effect of the firing temperature on a series of Pennsylvanian shale clays used for brick and aggregate making.

The transverse strength increased in a remarkable fashion with the development of a glassy phase as can be noted:

FIRING TEMPERATURES ON THE COLD TRANSVERSE STRENGTH OF FIRE CLAYS

| Room Temp. | 110°C | 500°C | 900°C | 1,000°C | 1,100°C |
|---|---|---|---|---|---|
| 79.60 | 129.00 | 87.20 | 928.60 | 3,282.80 | 6,405.20 |
| Modulus of Rupture (Lbs./in.$^2$) | | | | | |

The strength of clays which have been heated to points within the range of 110°C to 325°C is practically constant, but then begins to change as the temperature of the firing goes up. At temperatures of between 400°C–600°C, most clay minerals undergo decomposition and in this region a pronounced reduction in binding power occurs, because of the loss if strength in the plastic-clay type bond at the temperature level.

Above 1,000°C the amount of liquid formed increases considerably. On cooling, this liquid solidifies principally into a glass which acts as a cement to bind the mass together.

Normally, the higher the temperature of firing, the greater is the cold crushing strength, because the amount of glass and the size and degree of interlocking of the crystals is increased. The rate of firing may also affect the strength; if too rapid it may cause cracks which promote weakness. The duration of firing also affects the strength, because prolonged heating at elevated temperatures produces an increase in the portion of fusible bonding material.

FUNDAMENTAL CONCEPTS OF STRENGTH

One of the more important considerations of the strength of a material is in its crystalline nature. If the material is homogeneous, as is the case in some metals and in single crystals, rupture usually involves a ripping apart of the atoms which make up the species, whereas in a composite crystalline material composed of heterogeneous grains, contact planes frequently are sources of weakness and it is these which permit fracture cracks to disrupt the specimen. In a porous body, the various holes and voids are regions of weakness, and fracture will invariably follow these defects so that atomic displacements are not involved.

When fracture occurs in a body it invariably does so along the lines of weakness in the direction of the applied stress. Even individual crystals contain lattice defects and dislocations, which may be sufficient to initiate and propagate fracture cracks through the mass. In ceramic materials of a composite nature, fracture cracks rarely occur across a grain or crystal fragment.

More usually the fracture plane follows a highly complex path where contact between various mineral phases is at its weakest and particularly where it is possible to link up voids in the structure itself.

The atomistic concept of strength explains one other interesting feature of ceramic materials and other related inorganic species.

When a crystal of the covalent/ionic bond type is subjected to compression, the ionic components are being forced into closer juxtaposition. The forces of repulsion which then develop are large and one atom can only be separated from its neighbors by forces which are large enough to squeeze it from its normal position. If a similar material is subjected to tensional or elongational stresses or to shear forces, the principals involved are different.

As atoms or ions are pulled from their equilibrium position, restoring forces develop but these are more readily overcome and do not increase with distance from the equilibrium position to the same degree as those in compression.

A covalent/ionic bonded material is strong in compression, but weak in tension and shear, which is a characteristic of ceramic materials. Metallic bodies have a less rigid electron structure, and this is evidenced in their resistance to tensional and stretching forces.

Stresses are more readily accommodated and bodies with this type of bonding are normally higher in tensile strength than those with electron bonds of a more rigid nature.

Summarized, the terms sintering, vitrification, fusion, and crystallization might be characterized by the following:

When ceramic materials are raised to a sufficiently high temperature they are gradually converted from a solid to a liquid material, usually undergoing some decomposition in the process. According to the temperatures attained, the duration of the heating, and the chemical as well as physical properties of those materials, the amount of fluid produced may be very slight, and the term "incipient fusion" is then applied; a larger proportion of liquid may be produced and such a material on cooling is then said to be "sintered," especially if the liquid has been almost entirely superficial, i.e., when it forms a thin coating on many of the particles. When a large part (or the whole) of the material has been converted into a liquid or flowing plastic mass (even under pressure) the change is known as "fusion or melting."

Vitrification is an intermediate stage between sintering and and completed fusion.

The facts are apparent that the prior art lightweight aggregate is fired to temperatures of a low order of fusion and/or melting to accomplish the gas generated expansion. It is while the material is in this plastic condition that it is compacted again by the tumbling and impact forces in the rotary kiln.

In contradistinction, the aggregate of the present invention is expanded in the first few seconds upon entering the kiln, immediately then goes hard, and this expansion is actually maintained by up to three additional gassing phases while the material follows the tumbling and impact route through the kiln. Again, another very important difference is that fusion temperatures or melting temperatures are never reached at all, therefore, the vitrified material is traveling the firing cycle in an extremely hardened state, and does not compact.

COMPOSITION OF FIRED CLAYS

There are two entirely distinct phenomena occurring in clays heated at high temperature.

These are (a) crystal formation due to the recombination and recrystallization reactions, and (b) liquid formation. This material (liquid) may also crystallize on cooling, but siliceous melts are proven to supercool and often freeze to a homogeneous glass or a partially crystallized system.

The relative rates of crystal formation and of liquid development in a particular clay cannot be predicted with much certainty, because of the complexity and number of factors involved.

The composition, grain-size and distribution of minerals, firing rate and maximum temperature all contribute to both types of reaction and, in addition, the two phases may mutually interact after they have been produced.

Therefore, the liquid which develops during firing may dissolve some of the crystals formed by solid reaction processes.

THE ADDITIVE OF THE INVENTION.

The additive of the instant invention is a mixture of inorganic and organic ingredients, which mixture decomposes to generate gases at predetermined temperature levels. The gases are inert and are produced in such volume and pressure as to support and maintain the expanded structure throughout the manufacturing operation. As aforementioned, the additive decomposes to form gases at a relatively low temperature, that is, up to about 1500°F, to thereby expand the silica-containing material. This initial generation of gas expands the silica-containing material forming pores thereby producing a material which is mono-cellular in character. The additive then generates additional gases in stages to maintain the expanded condition of the material through its further processing, which will be described in more detail hereinbelow.

The additive, being a combination of inorganic materials, is preferably one of the following nine compositions:

1. Sodium bicarbonate
   Calcium sulfate
   Carbon
   Bentonite
2. Sodium peroxide
   Sodium sulfate
   Carbon
   Antimony Oxide
3. Hydrogen peroxide
   Calcium carbonate
   Calcium sulfate
   Carbon
4. Calcium sulfate
   Calcium carbonate
   either Ammonium carbonate
   or Ammonium bicarbonate
   Carbon
5. Calcium carbonate
   Methylene chloride
   Carbon
   Manganese dioxide
6. Calcium sulfate
   Calcium carbonate
   Carbon
   Aluminum
7. Calcium carbonate
   Zinc
   Potassium aluminum sulfate
   Carbon
   Antimony oxide
8. Calcium sulfate
   Calcium carbonate
   Aluminum
   Carbon
9. Lime water paste
   Calcium sulfate
   Calcium carbonate
   Carbon
   Aluminum.

In each instance, the ingredients of the additive composition having mesh size of from about −50 to about 300. It should also be noted, that certain of these preferred additive compositions include carbon. In these additive compositions, it is most preferred that the carbon be formed in situ during the gassing and expanding operation. This is accomplished by using, instead of carbon itself in the additive composition, small particles of a low molecular weight hydrocarbon such as, for example, polyethylene or polypropylene. By low molecular weight is meant a molecular weight of from about 1500 to about 25000. Thus, this would include such materials as polyethylene wax as well as other high-pressure polymerized polyethylenes wherein the manufacturing process has been slightly modified by using a chain transfer agent or telogen. This would also include polyethylenes which have been thermally cracked to form low molecular weight polymers. The low molecular weight hydrocarbon in the additive composition is carbonized under the processing conditions found in the rotary kiln. In other words, carbonizing conditions exist in the ordinary processing according to the instant invention. The carbon thus formed proceeds to react with certain other ingredients of the additive composition to generate gases.

The preferred additive compositions, with the preferred range of proportions, is set forth below in Table 1.

TABLE 1

| Ingredient | 1 | 2 | 3 | 4 | 5 | 6 | 7 | 8 | 9 |
|---|---|---|---|---|---|---|---|---|---|
| Sodium Bicarbonate | 5–0.15 | | | | | | | | |
| Calcium Sulfate | 5–0.15 | | 5–0.5 | 5–1 | | 10–5 | | 2–0.4 | 2–0.2 |
| Carbon* | 5–0.1 | 5–0.1 | 5–0.5 | 5–0.5 | 5–0.5 | 5–05 | 5–0.9 | 5–0.3 | 5–0.3 |
| Bentonite | 2–0.1 | | | | | | | | |
| Sodium Peroxide | | 8–1 | | | | | | | |
| Sodium Sulfate | | 6–0.5 | | | | | | | |
| Antimony Oxide | | 2–0.2 | | | | | 3–0.9 | | |
| Hydrogen Peroxide | | | 10–1 | | | | | | |
| Calcium Carbonate | | | 8–1 | 9–2 | 9–2 | 5–1 | 10–4 | 10–2 | 10–5 |
| Ammonium Carbonate or Ammonium Bicarbonate | | | | {7–1 | | | | | |
| Methylene Chloride | | | | | 7–1 | | | | |
| Manganese Dioxide | | | | | 2–0.5 | | | | |
| Aluminum | | | | | | 1–0.5 | | 2–0.3 | 4–0.9 |
| Zinc | | | | | | | 2–0.5 | | |
| Potassium Aluminum Sulfate | | | | | | | 7–2 | | |
| Lime Water Paste | | | | | | | | 8–1 | |
| Orthophosphoric Acid (0.023% in Water)** | | | | | | | | | |
| Water** | ✓ | ✓ | ✓ | ✓ | ✓ | ✓ | ✓ | ✓ | ✓ |

*In the form of a low molecular weight hydrocarbon such as polyethylene of MW 1,500–25,000.
**Sufficient amount to provide an extrudable mix.

THE LIGHTWEIGHT AGGREGATE OF THE INSTANT INVENTION.

According to the instant invention, a lightweight aggregate is made with a controlled expansion of up to 300 percent, which is consistent and of excellent quality. A practical ramification of this is that the manufacturing facility is producing up to 300 times the actual volume of material during the same time interval as before and utilizing the same equipment and input of raw material. Since the material of the instant invention has a high strength to weight ratio, is extremely hard, and has excellent insulating characteristics, it can find new and additional uses as a low cost, easy working, insulating material. The material is mono-cellular in character, can be extremely light in density, and resistant to moisture intrusion. In this regard, the lightweight aggregate can be made having the following physical characteristics, these characteristics being varied within the ranges given by certain simple changes in the processing conditions.

TABLE 2

LIGHTWEIGHT AGGREGATE
PHYSICAL SPECIFICATION AND PARAMETERS

1. STRENGTH
   - A. Compression — To Make 7,000 to 9,000 PSI Concrete
   - B. Shear — To Make 700 to 900 PSI Concrete
2. Specific Gravity (Dry Bulk) — 0.90 to 1.20
3. Dry Loose Weight — 30.0 to 40.0 Lbs. Per Cubic Foot
4. Hardness (MOHS' Scale) — 6.0 to 7.0
5. Surface and Texture — Smooth and Coated
6. Absorption — 1.0 to 2.0 Percent of Dry Weight (24 Hours)
7. Shape and Sizes — Rounded 0.005 to 0.75 Inch Irregular
8. Chemical Reactivity (−100° to +1000° F.) — Inert
9. Thermal Strength (−100° to +1000° F.) — 60 to 80 Percent at 1000° F.
10. Abrasion — ASTM : C 131 −64 T
11. Pore Size and Character — 0.3 to 0.1 CM. —Non Communicative
12. Specific Heat (100° to 2000° F.) — Average Over This Range 0.2 − 0.26 (C.G.S. Units)

The lightweight aggregate of the instant invention is made by mixing the silica-containing material with the additive, extruder pelletizing the mixture, charging the same to a kiln, and processing the composition in the kiln. The processing is done by heating the mixture to a relatively low temperature at which the additive generates a gas which immediately expands the silica-containing material. As the expanded aggregate moves down the line, the temperature is raised in stages to provide for the further generation of gas in the additive, this gas maintaining the aggregate in its expanded condition. The aggregate hardens as it passes down the line without melting or compacting. The single most important aspect of the instant inventive process is the fact that the aggregate is expanded at relatively low temperatures and then it is matured at increasing temperatures, but it is never allowed to reach the pyroplastic condition. Keeping this in mind, it is clear that the fuel cost for the processing is lower than in the presently available methods. The expansion system provided by the additive is consistent and repeatable, regardless of the composition of the silica-containing material, thereby achieving uniform and consistent quality of the product. Furthermore, the pore, or cell, size can be controlled, thereby providing the ability to control the strength and specific heat. The fact that the cells are non-communicative means that water absorption characteristics are also controlled.

It should be noted that while the primary ingredients of the composition are a silica-containing material and the additive as defined above, minor amounts of certain other ingredients can also be included. These ingredients can be viscosity or friction loss reducing agents such as natural gums. Such natural gums could include guar gum, gum karaya, and other such natural gums which are known in the art. These additional ingredients could also include lubricants for assisting in the extrusion pelletizing process, coloring materials, and the like.

As already mentioned, the silica-containing material can be beach sand which is essentially pure silica. It could also include fly ash and minerals of sedimentary origin which will mature on firing. Such minerals of sedimentary origin inlude clay, shale, and slate which can be pulverized. Typical clays which can be used are china clay, flint clay, ball clay, brick clay, montmorillonite, siliceous clay, and plastic fire clay. The sedimentary minerals generally have a composition falling within the ranges given in Table 3.

TABLE 3

COMPOSITION OF SEDIMENTARY MINERALS

| Ingredient | % By Weight |
|---|---|
| $SiO_2$ | 38 – 83 |
| $Al_2O_3$ | 9 – 39 |
| $Fe_2O_3$ | 0.5 – 7 |
| FeO | 0 – 0.9 |
| $Fe_2S$ | 0 – 0.6 |
| MgO | 0 – 9 |
| CaO | 0 – 16 |
| $Na_2O$ | 0 – 6 |
| $K_2O$ | 0 – 6 |
| $H_2O$ (as hydrates) | 0 – 3 |
| $H_2O$ (free) | 2 – 14 |
| $CO_2$ | 0 – 21 |
| $TiO_2$ | 0 – 2 |
| $P_2O_5$ | 0 – 0.2 |
| $SO_3$ | 0 – 0.03 |
| MnO | 0 – 0.02 |

According to a preferred embodiment of the present invention, the process of forming the composition includes thoroughly mixing specified quantities of the additive composition into the basic raw clay. For purposes of this discussion "clay" as used herein includes shale. If the clay has been previously dried and ground into a compatible particulate size with the additive, the combined materials can be thoroughly mixed and blended in the dry powder state and then pelletized in conventional pelletizing equipment which depends on droplets of water agglomerating the dry powder mix into pellets of varying sizes and shapes. If the clay is raw and still contains the water content as in its natural state, then the dry powder can be added directly to the clay mass, blended with additional water to increase the total moisture content to the levels required for extrusion technique and equipment. This blending operation can be accomplished with conventional machinery and is called a "pugging" operating. After the chemical additive is thoroughly blended throughout the mass the clay is fed into the extruder which serves to continuously extrude the mass into numerous one quarter inch rods of the composite mass, at which time an automatic cutting device cuts off the extruded rods into the appropriate lengths for the product.

These cut-off pellets fall onto a conveyor which transports the pellets directly into the kiln at the feed end. The conveyor could as easily transport the pellets into sintering furnaces instead of a kiln, which also will serve to produce the final product.

The temperatures at the feed end of the kiln (or sintering furnace) normally range from 600°F to 1000°F and the chemical composition is designed to respond immediately to that temperature range to expand over a time interval of 30 seconds to 3 minutes to achieve up to a 300.0 percent increase in volume.

As the time-temperature environment is increased the rolling, tumbling, pellet traverses normally into an increased temperature zone which, at temperature levels of 1500° to 2250°F actuate second and third gas producing systems. These systems maintain the original expansion while the clay minerals undergo the chemical transitions, substitutions, and changes which occur during normal mineral vitrificaton (incipient fusion to fusion). As the pellet rolls, tumbles, and traverses further into the rotary kiln, even higher temperatures are imposed at which time still another gas producing system is activated which in itself is capable of maintaining the complete degree of expansion originally achieved. This area within the kiln provides the time and temperature which completes the vitrification of the clay and the fusion of the minerals to the degree that enough fusible matter is liquified to flow into and around the mass of felted crystals which are also concurrently growing within the molecular structure of the combined minerals. When the viscous flow of liquid has effectively welded the crystal mass together this structure can be compared, on a molecular level, to a tangled box of pins, each of which has been welded to the other, which is the perfect mechanical structure to provide a maximum amount of strength with a minimum density and/or weight.

In the examples which follow, clays and shale were used having compositions as set forth in Table 4.

| TYPICAL INGREDIENTS | % BY WEIGHT | PARTICLE SIZE |
|---|---|---|
| Silica-containing material (sand, ground slate, fly ash, or any clay or shale from Table 4) | 80.0 – 99.0 | −50 to 300 mesh |
| Sodium hydrogen carbonate | 5.0 – 0.2 | |
| Calcium sulphate | 5.0 – 0.2 | |
| Carbon | 5.0 – 0.1 | |
| Bentonite (sodium) | 2.0 – 0.1 | |

Mixing

The dry ingredients are mixed together in a container to form a blend. If the clay is as removed from the earth (not dry) then additional water should be blended into the clay to reach the total moisture content of 14 to 18 percent based on the clay, and then the dry chemicals should be added to the clay plastic mass with a vigorous, thorough mechanical mixing and/or blending to ensure that the chemicals and the added water are thoroughly and evenly dispersed throughout the plastic mass of the clay.

Forming

The plastic mass is then extruded and then processed in a kiln at temperatures of from 400°F (205°C) to 1500°F (420°C), at which time the plastic mass will expand to fill the mold, or if not confined will simply expand freely until the volume is nominally 100 – 150 percent greater.

It is important that the plasticity of the clay be of such order that the clay be mobile with adequate viscosity to contain the gases that will be generated.

Plasticity definitely is related to the formation of water films of a certain order of thickness around each grain, and this appears to be about 2,000 A. When more than the required amount is present the free-water permits flow, with a reduction in plastic properties. When too little water is present the effect is one that starves the clay particles, then the individual particles touch and plasticity is again destroyed.

These adsorbed water films appear to have an in-

TABLE 4

CHEMICAL ANALYSES OF TYPICAL CLAYS
(% by weight)

| | 1 Kaolinite | 2 Kaolinite | Siliceous | Shale | 1 Brick | 2 Brick | Semi Flint | Plastic Fire | Ball A | Ball B |
|---|---|---|---|---|---|---|---|---|---|---|
| SiO₂ | 46.18 | 45.8 | 82.45 | 54.64 | 38.07 | 57.02 | 43.04 | 58.10 | 56.4 | 53.96 |
| Al₂O₃ | 38.38 | 38.5 | 10.92 | 14.62 | 9.46 | 19.15 | 36.49 | 23.11 | 36.0 | 29.34 |
| Fe₂O₃ | 0.57 | 0.7 | 1.08 | 5.69 | 2.70 | 6.70 | 1.37 | 1.73 | | 0.98 |
| FeO | | | | | | | 0.83 | 0.68 | | |
| Fe₂S | | | | | | | 0.24 | 0.55 | | |
| MgO | 0.42 | | 0.96 | 2.90 | 8.50 | 3.08 | 0.54 | 1.01 | TR. | 0.30 |
| CaO | 0.37 | TR. | 0.22 | 5.16 | 15.84 | 4.26 | 0.74 | 0.79 | 0.4 | 0.37 |
| Na₂O | 0.10 | TR. | | 5.89 | 2.76 | 2.83 | 0.46 | 0.34 | 2.0 | 0.12 |
| K₂O | 0.58 | | | | | 2.03 | 1.10 | 1.90 | 3.3 | 0.28 |
| H₂O(as hydrates) | | | | 0.85 | | | 0.82 | 2.27 | | |
| H₂O (free) | 13.28 | 13.6 | 2.40 | 3.74 | 2.49 | 3.45 | 12.44 | 7.95 | 7.9 | 12.82 |
| CO₂ | | | | | 4.80 | 20.46 | 0.05 | 0.05 | | |
| TiO₂ | 0.04 | 1.4 | 1.00 | | | | 0.91 | 1.79 | 1.40 | 1.64 |
| P₂O₅ | | | | | | | | 0.10 | 0.17 | 0.15 |
| SO₃ | | | | | | | | 0.01 | 0.03 | 0.03 |
| MnO | | | | | | | | 0.01 | 0.01 | 0.02 |

To provide those skilled in the art with a better understanding of the invention, the following illustrative examples are presented. In the examples, the following procedure was followed.

duced structure by virtue of the surface with which they are in contact, and a continuum is therefore formed which surrounds all of the particles to provide a degree of rigidity and at the same time an ease of deformation. The dependence of plasticity on both the water content and the nature of the associated cations must lead to the conclusion that the property is associated with the highly complex electrical relationships surrounding the colloidal micelle.

When the zeta-potential of a system is of low order, the counter-balancing cations influence the system only at short distances from the mineral surfaces. Nevertheless, when the counter-balancing cations are of small size and high charge, they impose a more rigid structure on water molecules in their area, than those of large size and small charge do.

At low water content, the hydrospheres around each particle merge and the mass attains a stability of structural formation in which continuity is developed between rigidly bound water molecules in adjoining particles.

Clays are quite different in the amount and quality of their plasticity. The fat or strong clays undergo a maximum change in shape on the application of a small force; lean or short clays undergo a minimum change of shape and require a greater force to effect the change.

It is universally agreed that plasticity in clays existed within a comparatively narrow range of water content. Above a certain value the clay mass becomes a mud or slip while a dry clay is completely without plasticity. Therefore, as stated earlier, the maximum plasticity of a clay is developed at a specific water content which corresponds to a film around each particle about 2,000 A thick. For most clays this would approximate a water content of from 15 to 25 percent by weight, and preferably about 18 percent.

Expansion

After the initial expansion is effected through the generation of contained gas within the material, at the indicated temperature, approximately 1 – 5 minutes of the firing time will have occurred.

The material can immediately be fired to temperatures required for incipient fusion, and then on to vitrification by gradually raising the temperatures to a peak of 1800°F (983°C) to 2250°F (1233°C), depending on the particular clay utilized as the basic mass.

The entire operation can be accomplished in a stationary kiln, a tunnel kiln, or a rotary kiln if the parts lend themselves to a tumbling operation such as an aggregate for concrete.

Reactions

The chemical reactions that can occur at room temperatures in this plastic composition are nominal, therefore, the mixed plastic mass is capable of being stored for several days with no degradation in the potential other than the possible loss of some of the essential water through evaporation.

Using the first additive shown in Table 1, the reactions that result from the application of the 400°F (205°C) to 1500°F (815°C) heat, which causes the original expansion mentioned earlier, begins with the gradual decomposition of the $Na_2HCO_3$ to liberate $CO_2$ and $H_2O$. This $CO_2$ gas expands quickly (30 seconds to 3 minutes) within the plastic mass to form a structure comprised of countless small hollow or void areas which are principally monocellular, that is not connected to other similar cells, or voids.

However, it has been noted that when the first heat is applied to the material, a temperature of 700°F (372°C) to higher temperatures can and often does produce a thermal shock to the material which produces much higher gas pressure within the mass—several orders of magnitude higher than the lower temperature of 400°F, and, these intense gas pressures cause an additional and stronger expansion effect at the central area of the shape, in addition to the other normal multi-cellular characteristic described earlier. This second effect is normally evidenced as a larger open area, or several larger open areas located at or near the mass center; however, this does not materially affect the physical characteristics of the shape unless strength parameters are not complied with as a result of this side effect. The mass density can be controlled to a considerable degree, by utilizing the heat exposure as a tool.

a. A gradually accelerating heat beginning at nominally 400°F will produce a firm multi-cellular mass of unconnected cells (mono-cells).

b. Thermal shock resulting from an abrupt exposure to 800°– 1000°F produces a combination of the monocellular mass and a secondary open area at the mass center that may assume any shape or shapes and become simply a much larger void area. In many instances this second condition is very desirable because of the effect it has on the mass density (weight).

When the $NaHCO_3$ decomposes to liberate the $CO_2$ and $H_2O$, then $Na_2CO_3$ is formed. As the temperature increases and reaches a level that will promote mutual exchange, or double decomposition, the $CaSO_4$, and the $Na_2CO_3$ will interact:

$$CaSO_4 + Na_2CO_3 = CaCO_3 + Na_2SO_4$$

In all such reactions, the acid radical or ion, of one base leaves it and becomes combined with another base, the acid radical or ion previously combined with the latter then combining with the first base. The general equation for all mutual exchanges of this type is:

$$AB + CD = AD + CB.$$

As the time-temperature increases the $CaCO_3$ begins to decompose evolving $CO_2$ gas; however, the action is considerably affected by the fact that the gas cannot escape, therefore the chemical reaction can be stated as follows:

$$CaCO_3 \rightleftharpoons CaO + CO_2$$

The decomposition or more correctly dissociation continues until the vapor pressure of the gaseous product reaches a critical value. The decomposition then ceases so long as the heat level is maintained at that point or condition. If the temperature is increased, decomposition will commence again and continue until the pressure-equilibrium at that temperature is reached. On cooling carbon dioxide will be reabsorbed and calcium carbonate ($CaCO_3$) will be reformed as the temperature drops and a vacuum is established. Should the mass structure permit a partial loss of the $CO_2$ through pores in the material itself then there will be a combination of $CaCO_3$ and $CaO$ resident as part of the structure.

At temperatures around 1623°F (884°C) the $Na_2SO_4$ will melt and/or react with the carbonized carbonaceous material in that it is reduced by the carbon to give off large volumes of free gas. The gases generated comprise sulphur dioxide, carbon dioxide, nitrogen, and gaseous oxygen.

Some nominal amounts of silicates of calcium ($2CaO \cdot SiO_2$) may form from any excesses of $CaO$ and/or $CaCO_3$, although usually any free $CaO$ will combine with $Al_2O_3$ and $SiO_2$ to form a liquid phase at temperatures below those at which crystalline modifications form rapidly Liquid formation is desirable only to a limited degree, to fuse and/or weld the mineral crystals as they continue forming and growing at the molecular level within the structure. Liquid formation in clays commences at the temperature of the lowest entectic point of the components in the mixture; then, with progressively increasing temperature, the amount of liquid phase increases rapidly. Alkali-bearing minerals of clays with a high content of adsorbed, exchangeable alkali cations being to fuse at low temperatures; a mixture of sodium, alumina and silica, for example, partially melts at 1349°F (732°C); the equivalent mixture with potassium replacing sodium shows incipient fusion at 1251°F (695°C).

Normally, little glass is produced below a temperature of 1832°F (1000°C), unless a considerable portion of alkali is present. The glassy matter then usually beings to develop at about 1380°F, and increases gradually up to about 2100°F (1150°C), the fused material dissolving the smaller particles and fusing the crystals forming within the structure. The finishing stage of the firing is that in which the desired reactions and other changes are completed or have progressed to such an extent as to produce the requisite properties.

In this stage the temperature of the kiln should be maintained relatively constant. For this reason, this period is known as the "soaking state"; the expanded and partially vitrified material can be regarded as soaking in heat. The purpose of this extended time-temperature operation is to enable the multiple changes which were initiated in earlier stages (lower temperatures) to be completed, or to progress to the point where the desired properties are achieved in the product.

This is accomplished when the amount of fusion (fused matter) and, consequently, the amount of chemical action between the fluxes and the more refractory components produce that amount of vitrified and/or glassy material which flows into the interstices between crystals, and particles, to render the mass impermeable to the desired degree.

The following examples provide data of sample mixes falling within the relationship referred to above, and are given by way of illustration only and not by way of limitation, of the preferred composition material.

EXAMPLE 1

| INGREDIENTS | WEIGHT GRAMS | PERCENT BY WEIGHT |
|---|---|---|
| Clay (Brick 2) | 100.00 | 86.96 |
| Sodium Hydrogen Carbonate | 5.00 | 4.35 |
| Calcium Sulphate | 5.00 | 4.35 |
| Carbon | 3.00 | 2.60 |
| Bentonite | 2.00 | 1.74 |
|  | 115.00 | 100.00 |

EXAMPLE 2

| INGREDIENTS | WEIGHT GRAMS | PERCENT BY WEIGHT |
|---|---|---|
| Clay (Plastic Fireclay) | 100.00 | 89.28 |
| Sodium Hydrogen Carbonate | 4.00 | 3.57 |
| Calcium Sulphate | 4.00 | 3.57 |
| Carbon | 2.50 | 2.23 |
| Bentonite | 1.50 | 1.35 |
|  | 112.00 | 100.00 |

EXAMPLE 3

| INGREDIENTS | WEIGHT GRAMS | PERCENT BY WEIGHT |
|---|---|---|
| Clay (Kaolinite 2) | 100.00 | 93.89 |
| Sodium Hydrogen Carbonate | 2.00 | 1.87 |
| Calcium Sulphate | 2.00 | 1.87 |
| Carbon | 1.50 | 1.44 |
| Bentonite | 1.00 | 0.93 |
|  | 106.50 | 100.00 |

EXAMPLE 4

EXAMPLE 1-continued

| INGREDIENTS | WEIGHT GRAMS | PERCENT BY WEIGHT |
|---|---|---|
| Clay (Siliceous) | 100.00 | 99.410 |
| Sodium Hydrogen Carbonate | 0.20 | 0.199 |
| Calcium Sulphate | 0.20 | 0.199 |
| Carbon | 0.10 | 0.096 |
| Bentonite | 0.10 | 0.096 |
|  | 100.60 | 100.00 |

Example 1 produced the most porous and lightest density material of all the sample mixes. The material had nominal value as a structural material, but excellent insulating properties.

Example 2 produced the most dense and therefore heaviest material of all the sample mixes. However, there was still adequate porosity to provide an acceptable material for certain lightweight concrete aggregate applications which required extraordinary strength in compression and tension.

Examples 3 and 4 fall exactly between 1 and 2 to yield an expansion between the two extremes described before.

A series of lightweight aggregates according to the present invention were made using the remaining eight additives shown in Table 1. The method followed was the same as that described above with reference to Examples 1 through 4. Aggregates were made using each of the clays set forth in Table 4.

EXAMPLE 5

| INGREDIENTS | PERCENT BY WEIGHT | PARTICLE SIZE |
|---|---|---|
| Any Clay From Table 4 | 80 – 99.0 | |
| Sodium Peroxide | 8 – 1.0 | |
| Sodium Sulfate | 6 – 0.5 | −50 to 300 mesh |
| Carbon | 5 – 0.1 | |
| Antimony Oxide | 2 – 0.2 | |

Original expansion started at 250°–300°F. Expansion was maintained throughout the firing by temperature activated gas systems which automatically generated gas at the correct times to maintain the structure from compacting.

EXAMPLE 6

| INGREDIENTS | PERCENT BY WEIGHT | PARTICLE SIZE |
|---|---|---|
| Any Clay From Table 4 | 80 – 99 | |
| Hydrogen Peroxide | 10 – 1.0 | |
| Calcium Carbonate | 8 – 1.0 | −50 to 300 mesh |
| Calcium Sulphate | 5 – 0.5 | |
| Carbon | 5 – 0.5 | |

Original expansion started at only 200°F, and was maintained as above.

EXAMPLE 7

| INGREDIENTS | PERCENT BY WEIGHT | PARTICLE SIZE |
|---|---|---|
| Clay From Table 4 | 80 – 99.0 | |
| Ammonium Carbonate / Ammonium Hydrogen Carbonate | 7 – 1.0 | |
| Calcium Carbonate | 9 – 2.0 | −50 to 300 mesh |
| Calcium Sulfate | 5 – 1.0 | |
| Carbon | 5 – 0.5 | |

This composition started expanding at 150°F and accelerated rapidly as temperatures rised. Everything else as above regarding the maintenance of this original expansion.

EXAMPLE 8

| INGREDIENTS | PERCENT BY WEIGHT | PARTICLE SIZE |
| --- | --- | --- |
| Clay From Table 4 | 80 – 99.0 | |
| Methylene Chloride | 7 – 1.0 | |
| Calcium Carbonate | 9 – 2.0 | –50 to 300 mesh |
| Carbon | 5 – 0.5 | |
| Manganese Dioxide | 2 – 0.5 | |

This composition started expanding at 300°F. It was a softer expansion (gentler), however, it continued longer. Other factors same as before.

EXAMPLE 9

| INGREDIENTS | PERCENT BY WEIGHT | PARTICLE SIZE |
| --- | --- | --- |
| Clay From Table 4 | 80 – 99.0 | |
| Calcium Sulfate | 10 – 5.0 | |
| Aluminum Powder | 1 – 0.5 | –50 to 300 mesh |
| Calcium Carbonate | 5 – 1.0 | |
| Carbon | 5 – 0.5 | |

This formulation started expanding at 150°F. Other reactions as described earlier.

EXAMPLE 10

| INGREDIENTS | PERCENT BY WEIGHT | PARTICLE SIZE |
| --- | --- | --- |
| Clay From Table 4 | 80 – 99.0 | |
| Zinc Powder | 2 – 0.5 | |
| Aluminum Potassium Sulfate | 7 – 2.0 | –50 to 300 mesh |
| Calcium Carbonate | 10 – 4.0 | |
| Carbon | 5 – 0.9 | |
| Antimony Oxide | 3 – 0.9 | |

This formulation began expanding at 150°F. Other reactions as described earlier.

EXAMPLE 11

| INGREDIENTS | PERCENT BY WEIGHT | PARTICLE SIZE |
| --- | --- | --- |
| Clay From Table 4 | 80 – 99.0 | |
| Calcium Carbonate | 10 – 2.0 | |
| Calcium Sulfate | 2 – 0.4 | –50 to 300 mesh |
| Carbon | 5 – 0.3 | |
| Lime & Water (Lime Water Paste) | 8 – 1.0 | |
| Aluminum Powder | 2 – 0.8 | |

This formulation started expanding at room temperature. Other reactions as described earlier.

EXAMPLE 12

| INGREDIENTS | PERCENT BY WEIGHT | PARTICLE SIZE |
| --- | --- | --- |
| Clay From Table 4 | 80 – 99.0 | |
| Calcium Carbonate | 10 – 5.0 | |
| Calcium Sulfate | 2 – 0.2 | –50 to 300 mesh |
| Carbon | 5 – 0.3 | |
| Aluminum Powder | 4 – 0.9 | |
| Orthophosphoric Acid - Diluted to 0.023 % with Water | Replaces Water In Mix | |

This formulation started expanding at room temperature and was accelerated by heat. Other reactions as described earlier.

While the primary use of the present invention is for lightweight aggregates used as insulators, refractory materials, and as an aggregate for structural lightweight concrete, because of its unique characteristics and low cost it is obvious that many other uses will evolve such as in roadway and highway finishes, bridges, floating containers, etc.

It should be apparent from the foregoing detailed description that the objects set forth hereinbove have been successfully achieved. Moreover, while there is shown and described present preferred embodiments of the invention it is to be distinctly understood that the invention is not limited thereto but may be otherwise variously embodied and practised within the scope of the following claims.

Accordingly, what is claimed is :

1. A method of making a uniform lightweight aggregate comprising forming a composition by mixing from 80 to 99 weight percent of a material selected from the group consisting of silica sand, fly ash, clay, shale, and slate and from 20 to 1 weight percent of an additive, said additive comprising a combination of inorganic ingredients which decomposes to generate gases in four stages, in the first stage at temperatures of up to about 1500°F, in the second stage at 1550° to about 1650°F, in the third stage at from about 1650° to about 1800°F, and in the fourth stage at about 1800° to about 2250°F; pelletizing said composition; heating said composition in four stages, the first stage being up to about 1500°F, the second stage being from about 1550°F to about 1650°F, the third stage being from about 1650°F to about 1800°F, and the fourth stage being from about 1800°F to about 2250°F, to thereby decompose said additive and generate gases and expand said material in said first stage; and to decompose the additive and generate gases which maintain said material in its expanded condition and to harden the expanded material in the remaining stages; and regulating the temperature in each of said heating stages to prevent said material from reaching the pyroplastic condition.

2. A method as defined in claim 1, wherein said clay is selected from the group consisting of China clay, flint clay, ball clay, brick clay, montmorillonite, siliceous clay, and plastic fire clay.

3. A method as defined in claim 1, wherein said material is clay, shale, or slate, and comprises, in approximate percent by weight:

| | |
| --- | --- |
| $SiO_2$ | 38 – 83 |
| $Al_2O_3$ | 9 – 39 |
| $Fe_2O_3$ | 0.5 – 7 |
| FeO | 0 – 0.9 |
| $Fe_2S$ | 0 – 0.6 |
| MgO | 0 – 9 |
| CaO | 0 – 16 |
| $Na_2O$ | 0 – 6 |
| $K_2O$ | 0 – 6 |
| $H_2O$ (as hydrates) | 0 – 3 |
| $H_2O$ (Free) | 2 – 14 |
| $CO_2$ | 0 – 21 |
| $TiO_2$ | 0 – 2 |
| $P_2O_5$ | 0 – 0.2 |
| $SO_3$ | 0 – 0.03 |
| MnO | 0 – 0.02. |

4. A method as defined in claim 1, further comprising the step of grinding said material and said additive to between about –50 mesh and about 300 mesh prior to pelletizing.

5. A method as defined in claim 1, wherein said pelletizing is accomplished by extruding said composition and cutting the extrudate into short lengths, said composition containing sufficient water to be extrudable.

6. A method as defined in claim 1, further comprising charging the pelletized composition to a rotary kiln; heating said composition within said kiln while rotating same whereby the aggregate is formed, and discharging said aggregate from said kiln.

* * * * *